No. 850,466. PATENTED APR. 16, 1907.
P. I. CONRAD.
WHIP SOCKET.
APPLICATION FILED MAY 29, 1906.
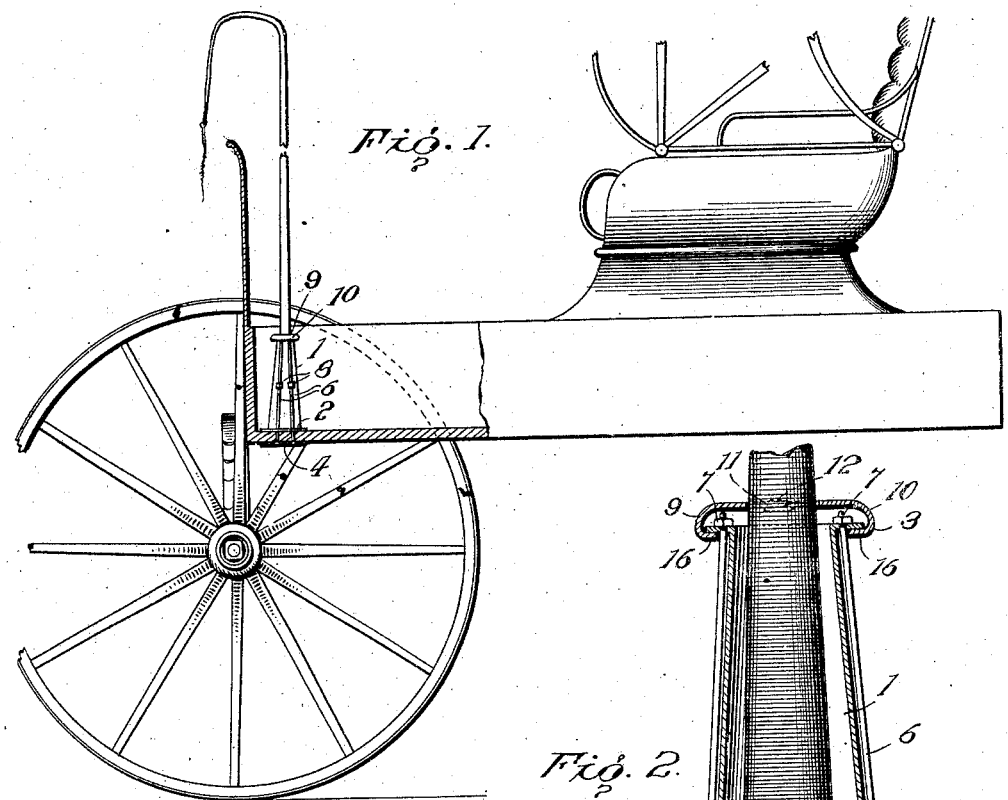
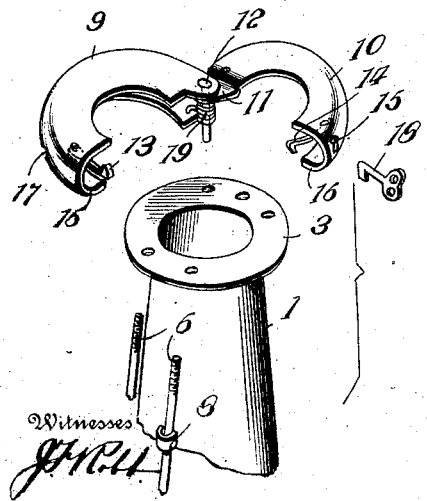
Inventor
P. I. Conrad.

UNITED STATES PATENT OFFICE.

PETER I. CONRAD, OF SUNBURY, PENNSYLVANIA.

WHIP-SOCKET.

No. 850,466.

Specification of Letters Patent.

Patented April 16, 1907.

Application filed May 29, 1906. Serial No. 319,389.

*To all whom it may concern:*

Be it known that I, PETER I. CONRAD, a citizen of the United States, residing at Sunbury, in the county of Northumberland and State of Pennsylvania, have invented certain new and useful Improvements in Whip-Sockets, of which the following is a specification.

The present invention aims to provide an improved whip-socket which is provided with means whereby the whip can be locked in position, so that it can neither be stolen nor used by unauthorized parties.

The invention contemplates a structure in which the parts mutually coöperate, so that the socket is locked in position upon the vehicle at the same time that the whip is locked within the socket.

For a full description of the invention and the merits thereof and also to acquire a knowledge of the details of construction of the means for effecting the result reference is to be had to the following description and accompanying drawings, in which—

Figure 1 is a side elevation of a portion of a vehicle with the whip-socket applied thereto, parts being broken away to show the method of securing the socket in position. Fig. 2 is a vertical sectional view through the whip-socket with a whip locked therein, the upper portion of the whip being broken away. Fig. 3 is a detail perspective view of the upper portion of the socket, the locking device being detached and the bolts loosened.

Corresponding and like parts are referred to in the following description and indicated in all the views of the drawings by the same reference characters.

The numeral 1 designates the body of the whip-socket, which is approximately cylindrical in shape and preferably tapers toward the upper end, as shown in the drawings. The lower end of the body 1 is provided with the basal flange 2, which fits against the bottom of the vehicle or other support to which the socket is secured, while the upper end of the socket is formed with the outwardly-extending annular flange 3. A base-plate 4 fits under the bottom of the vehicle or other support to which the socket may be secured and is provided with a series of countersunk openings 5, which in the present instance are four in number. A series of bolts 6 are employed to hold the socket in position, and these bolts pass upwardly through the countersunk openings in the base-plate 4, the bottom of the vehicle, and corresponding openings in the basal flange 2 and the upper flange 3. After passing through the openings in the upper flange the bolts 6 are capped by the nuts 7, which bear against the upper flange 3 and can be tightened, so as to clamp the socket securely in position.

In the preferred construction the body 1 of the socket is formed with the outwardly-projecting eyes or keepers 8, through which the shanks of the bolts 6 pass and which tend to prevent the bolts from being bent or otherwise injured.

The locking device comprises the two curved locking-arms 9 and 10, which fit against the upper face of the upper flange 3 and are so constructed that when in a locked position they fit tightly around the whip and also embrace the upper flange 3. One of the ends of each of the locking members 9 and 10 is provided with a perforated projection 11, and these projections overlap each other, so that the perforations register, and a bolt 12 can be passed therethrough, the said bolt also preferably passing through the flange 3. The opposite ends of the two locking members 9 and 10 are provided, respectively, with the two spring-catches 13 and 14, which are adapted to engage with each other when the two arms are brought together.

In order to unlock the device, a key 18 can be inserted through the opening 15 and the spring-catch 14 lifted out of engagement with the spring-catch 13. A flange 16 projects downwardly and inwardly from the outer edge of each of the curved locking-arms 9 and 10, and these flanges 16 are adapted to fit around and embrace the flanges 3 in such a manner as to hold the locking device in a close engagement with the socket. At the points where the flanges 16 would interfere with the bolts 6 the locking members 9 and 10 are cut away, as seen at 17. It will also be observed that the two locking-arms fit over the nuts 7 and that all access to the latter is shut off when the two arms are locked together and that the whip is accordingly locked to the vehicle at the same time that the whip is locked within the socket.

Attention is also directed to the spring member 19, which is located at the pivot-point of the two locking-arms and throws the latter apart when the spring-catch 14 is lifted out of engagement with the catch 13.

Having thus described the invention, what is claimed as new is—

1. In a device of the character described, the combination of a whip-socket provided with a flange, a pair of locking-arms pivotally connected to the flange and adapted to fit around a whip in such a manner as to hold the same against removal from the socket, the said locking-arms also being provided with means for engaging with the before-mentioned flange.

2. In a device of the character described, the combination of a whip-socket provided with an annular flange, bolts passing through the flange and securing the socket in position, nuts coöperating with the bolts and bearing against the flange, and a pair of locking-arms loosely connected to the flange and fitting over the before-mentioned nuts, the said locking-arms being adapted to engage with the whip to lock the same against removal from the socket.

3. In a device of the character described, the combination of a whip-socket provided with an annular flange, bolts passing through the flange and securing the whip-socket in position, nuts coöperating with the bolts and bearing against the flange, a pair of locking-arms fitting over the nuts and adapted to lock the whip against removal from the socket, the said locking-arms being provided with flanges which embrace the before-mentioned flange upon the socket.

4. In a device of the character described, the combination of a whip-socket, means for securing the whip-socket to a support, and a locking device for locking a whip within the socket, the said locking device also serving to prevent removal of the whip-socket from the support.

5. In a device of the character described, the combination of a whip-socket provided with a basal flange and also with an annular flange, a base-plate, fastening members passing through corresponding openings in the base-plate, basal flange and upper flange, and a pair of locking-arms loosely connected to the upper flange and adapted to prevent a whip from being removed from the socket.

6. In a device of the character described, the combination of a whip-socket provided at its lower end with a basal flange fitting against the support and at its upper end with an annular flange, fastening members passing through the support and corresponding openings in the basal flange and annular flange, and a pair of locking-arms loosely connected to the annular flange and adapted to prevent the whip from removal from the whip-socket.

In testimony whereof I affix my signature in presence of two witnesses.

PETER I. CONRAD. [L. S.]

Witnesses:
J. K. McWilliams,
A. N. Whitlock.